Jan. 14, 1958 W. C. MORSE 2,819,821
FLUID DELIVERY EQUIPMENT
Filed July 22, 1955 3 Sheets-Sheet 1
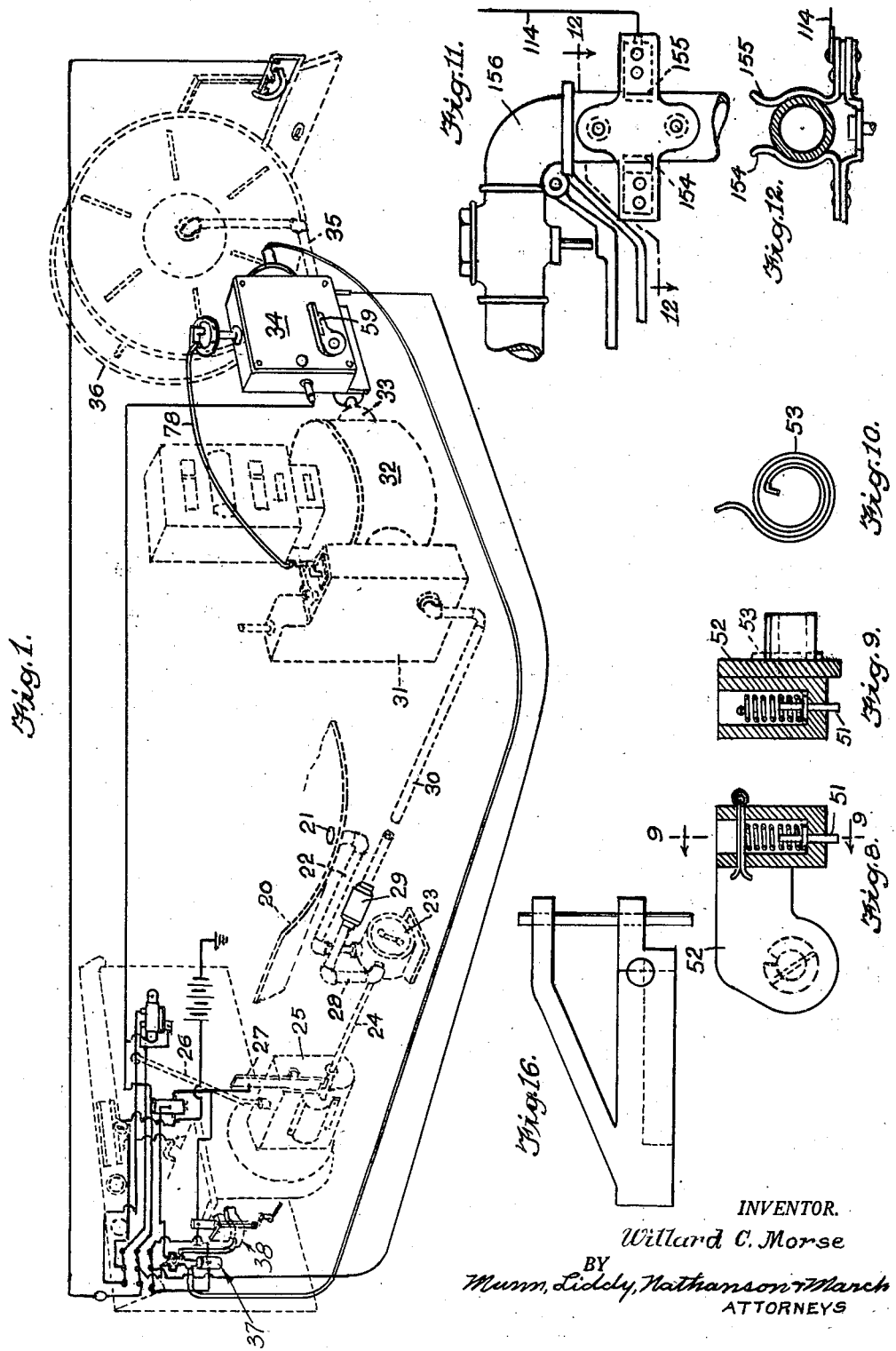
INVENTOR.
Willard C. Morse
BY
Munn, Liddy, Nathanson & March
ATTORNEYS

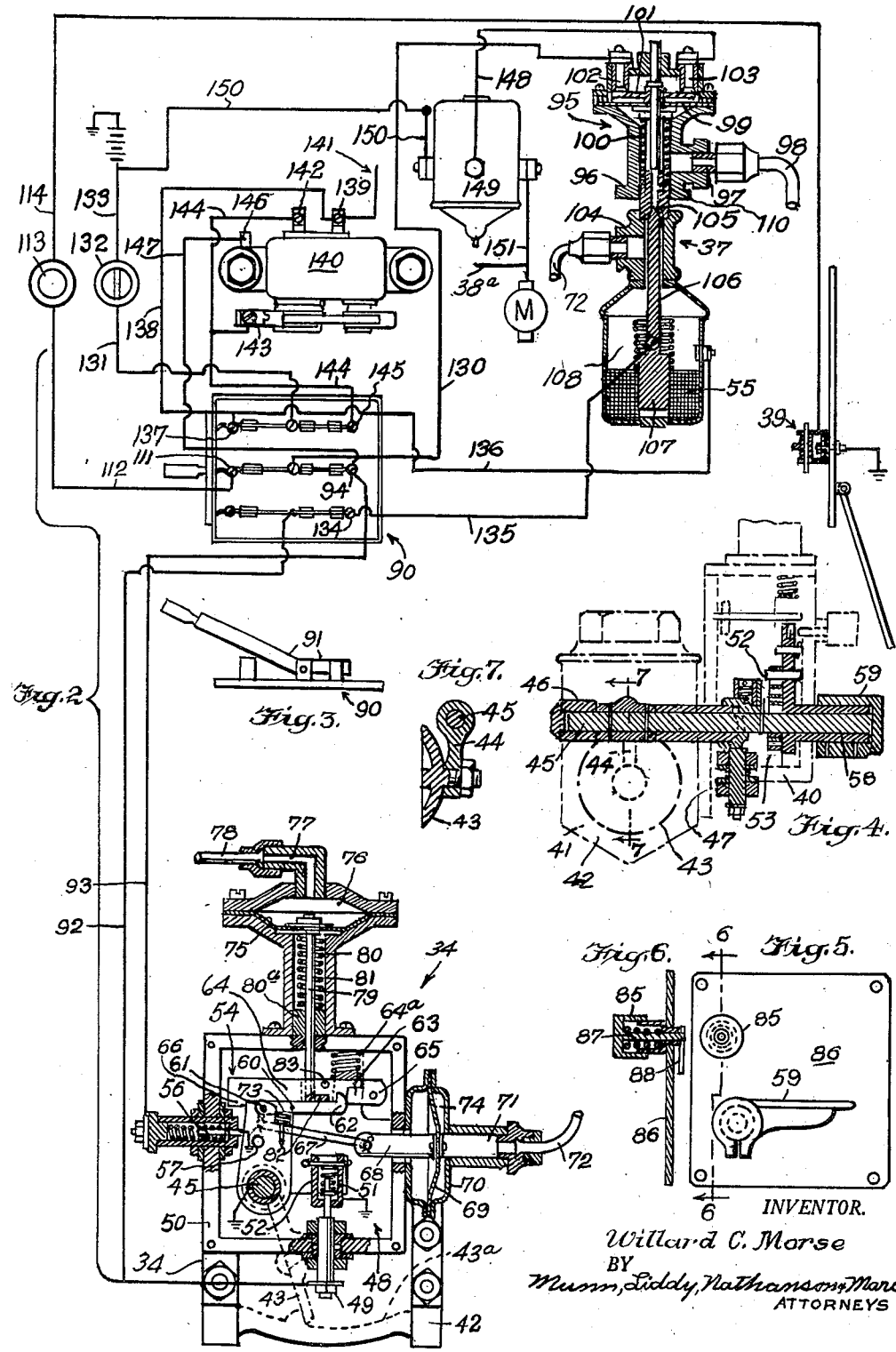

Jan. 14, 1958 W. C. MORSE 2,819,821
FLUID DELIVERY EQUIPMENT
Filed July 22, 1955 3 Sheets-Sheet 3

INVENTOR.
Willard C. Morse
BY
Munn, Liddy, Nathanson & March
ATTORNEYS

United States Patent Office 2,819,821
Patented Jan. 14, 1958

2,819,821

FLUID DELIVERY EQUIPMENT

Willard C. Morse, Lisbon Falls, Maine

Application July 22, 1955, Serial No. 523,828

10 Claims. (Cl. 222—75)

This invention relates to automatic control devices for use with fluid delivery equipment such as fuel oil trucks and the like.

The invention is illustrated and described herein in connection with the delivery of oil from a fuel truck. However, it should be understood that the invention is not limited to this particular application since it has utility in connection with the delivery of gasoline or other liquids from tank-type trucks generally.

An object of the invention is to provide a novel and improved automatic means for controlling the operation of an oil truck engine, causing it to operate only as oil is permitted to flow from the nozzle of the delivery hose.

A further object of the invention is to provide an improved device as above set forth, which is readily adaptable for use on trucks having power take-off mechanisms for actuating the usual positive displacement type of fluid pump and having meters of various types including those characterized as "predetermined" and also those known as "printers."

A feature of the invention resides in the provision of an improved apparatus as above set forth, by which the operator has positive control of the truck engine either at the hose nozzle or at the equipment compartment, the latter requiring that the said compartment has the usual shut-off valves.

Another feature of the invention resides in the provision of an improved control device as above characterized, which is of relatively simple and rugged construction, and which does not depend upon delicate or critical components and precise adjustments.

Still another feature of the invention resides in the provision of an improved control unit in accordance with the foregoing, which is capable of adjustment to enable controlled deliveries of oil or other liquids to be made to points at different elevations, as, for example, first and second story deliveries.

A still further object of the invention is to provide an improved control apparatus of the above type and safety means associated therewith, which makes it impossible for a driver to drive off with the truck while the hose is still in delivery position or displaced for any other reason from the can box or equipment compartment.

Other features and advantages will hereinafter appear.

In the drawings accompanying this specification, similar characters of reference indicate corresponding parts in the several views, in which:

Fig. 1 is a schematic diagram showing a control apparatus as provided by the invention, in conjunction with the fluid delivery system of an oil truck;

Fig. 2 is a diagrammatic view showing major portions of the control apparatus of the invention;

Fig. 3 is a side elevational view of the junction or selector switch utilized in Fig. 2;

Fig. 4 is a side elevational view of a flow, vacuum and manual controlled switch device of Fig. 2, hereinafter referred to as a Flovacumatic unit;

Fig. 5 is a front view of the Flovacumatic unit;

Fig. 6 is a section taken on line 6—6 of Fig. 5;

Fig. 7 is a section of the flow valve of the Flovacumatic unit taken on line 7—7 of Fig. 6;

Fig. 8 is a detail of the flow-operated switch arm of the Flovacumatic unit;

Fig. 9 is a section on line 9—9 of Fig. 8;

Fig. 10 is an elevation of a spiral return spring utilized in the Flovacumatic unit;

Fig. 11 is a view of the hose nozzle and support clip therefor;

Fig. 12 is a section taken on line 12—12 of Fig. 11;

Fig. 16 is a plan view of a carriage component of the Flovacumatic unit.

Figure 13:
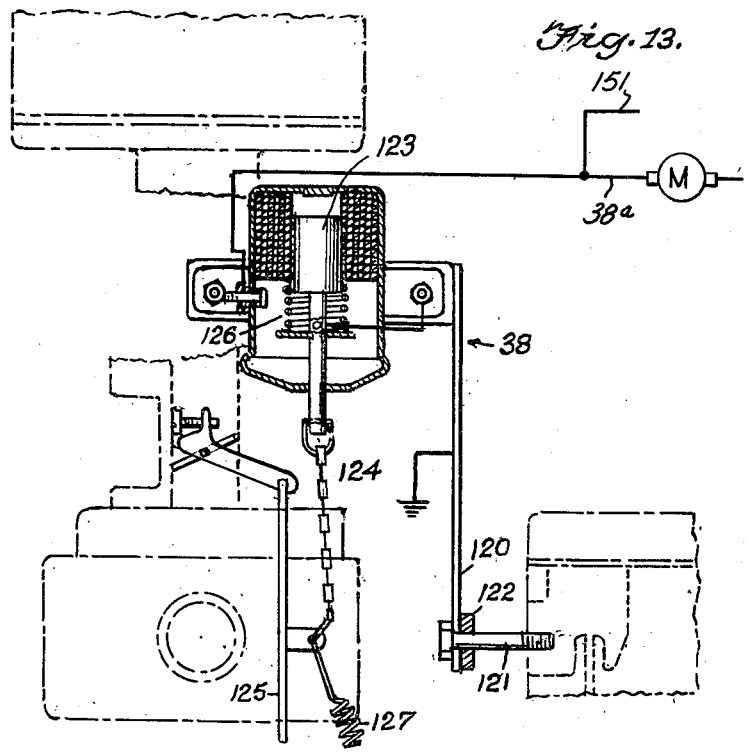
Fig. 13 is a detail showing the accelerator-advance solenoid.

Referring to Fig. 1, there is indicated by a numeral 20 a section of a tank or container such as may be carried by a vehicle for the purpose of transporting fuel oil or the like. The tank 20 has a discharge opening or outlet 21 in its lower portion, connected by a discharge line or pipe 22 to a pump 23 which is preferably of the usual positive displacement type.

The pump 23 may be driven from a shaft 24 extending from a transmission and power take-off device 25 such as is commonly provided on trucks of this type. The transmission and power take-off device 25 has the usual shift lever 26 and control lever 27, the latter being adapted to connect or disconnect the pump shaft 24 from the truck engine.

A discharge line 28 extends from the pump 23 to a back pressure or check valve 29, from which a line or pipe 30 extends to a valve and air eliminator device 31 constituting part of the standard equipment of the fuel truck.

Adjacent the valve and air eliminator 31, which is normally located at the rear of the truck within the can box thereof, there is provided a liquid meter 32 which may be of the "predetermined shut-off" type or the "printer" type or any other suitable meter; however, a meter is not necessary to the functioning of the device of this invention.. From the meter 32 a line 33 extends to a control unit 34 provided by the invention, and the unit 34 is connected by a pipe line 35 to the usual hose reel 36. I term the unit 34 a Flovacumatic unit, since it is responsive to the flow of oil through the lines 33 and 35 and also responsive to vacuum from the intake manifold of the truck engine.

In conjunction with the Flovacumatic unit 34 and back pressure valve 29 I provide a novel combination vacuum switch and valve device 37, Figs. 1 and 2, a throttle-actuating solenoid 38, and an automatically operated grounding switch 39, together with an appropriate circuit to provide a novel and advantageous automatic control of the truck engine and thereby greatly facilitate the work of the delivery man and reduce the possibility of error on his part.

In connection with the latter there is positively prevented any likelihood of the operator driving off with the truck without having first replaced the delivery hose completely in the equipment compartment and readied the truck for travel. The improved control device of this invention enables the operator to start and stop the truck engine by actuating the nozzle of the delivery hose, and eliminates the necessity for the engine operating needlessly prior to arranging the equipment for delivery of oil. It is to be noted that the present control device virtually makes it impossible for an operator to drive off with the truck while the hose is still connected with the customer's tank.

In accomplishing the above, referring to Fig. 2, the Flovacumatic unit 34 is of special importance. This unit comprises a casing 40 having a rear portion 41 constituting a separate compartment and arranged to enable the oil or other liquid to pass through it. The casing portion 41 has threaded female fittings 42 for receiving the fuel lines, and has a gate 43 arranged to be actuated by the flow of fluid, said gate being carried by an arm 44 secured to a shaft 45 which turns in bearings 46 of the casing. The shaft 45 passes through a partition or wall 47 between the casing parts 40 and 41, and extends through the forward casing part 40, projecting at the front therefrom as shown in Fig. 4.

Within the casing 40 an electrical grounding switch 48 is provided, comprising an insulated contact 49 mounted on the bottom wall 50 of the casing 40 and comprising a grounded, movable spring-charged contact 51 carried by an arm 52 which is splined to the shaft 45 to turn therewith. A spiral coil spring 53 is connected with the shaft 45 and has its outer end joined to another component, as will be hereinafter more fully described, whereby the shaft 45 is normally continuously urged in a clockwise direction as viewed in Fig. 2, thereby to maintain the gate 43 in a vertical position closing the passage 43a through the casing part 41.

The electrical switch 48 is used in conjunction with a second electrical switch 54 disposed in the casing 40, to automatically control the valve portion of the vacuum switch and valve unit 37 shown in Figs. 1 and 2.

As seen in Fig. 2, the unit 37 includes a solenoid 55 whose circuit includes the switches 48 and 54.

The switch 54 comprises a stationary, insulated spring-charged contact 56 co-operable with a movable rounded contact comprising a grounding lever 57 rotatively movable bout the shaft 45. The lever 57 is carried by a sleeve 58 turnable on the shaft 45 and carrying a manually operable lever 59 by which it may be turned from the exterior of the casing 40. As viewed in Fig. 2, when the grounding lever 57 is turned counterclockwise it can be brought into engagement with the stationary contact 56 to ground the latter.

The movement of the lever 57 is controled by the spring 53 which is connected to it, and also by a locking lever 60 pivotally carried on the lever 57 by a pivot pin 61. The locking lever 60 has a hooked end 62 engageable with an abutment member 63 (also termed a manual lock member) which is carried on a carriage 64 swingable in the casing 40 about a pivot 65 thereof. A plan view of the carriage 64 is shown in Fig. 16. The carriage 64 is normally urged downwardly by a spring 64a and has a hooked end 66 engageable with an upper extremity of the grounding lever 57 to position the latter just short of engagement with the stationary contact 56, as seen in Fig. 2, when the grounding lever is moved counterclockwise under the action of the spring 53 upon release of the locking lever 60 from the abutment 63.

The grounding lever 57 is also controlled by a link member 67 connected with a plunger 68 in turn controlled by a diaphragm 69 in a housing 70, the latter being connected by means of a fitting 71 and vacuum line 72 to the vacuum switch and valve unit 37. The locking lever 60 is normally urged upward by a spring 73, and when a vaccum is created in the right chamber 74 of the casing 70 of the diaphragm 69 it will shift the plunger 68 and link 67 to the right as viewed in Fig. 2, thereby further separating the grounding lever 57 from the contact 56 and enabling the locking abutment 66 to retain the grounding lever in the said separated position. This is the only duty of vacuum in the chamber 74.

An additional factor, responsive to pressure of oil in the fuel line 30 and air eliminator 31, also influences the operation of the grounding lever 57. This factor comprises a diaphragm 75 carried in a chamber 76 which is connected by a fitting 77 to a line 78 leading to the air eliminator unit 31 or fuel line 30, Fig. 1. The diaphragm 75 has attached to it a drive rod 79 which is normally urged upward by a helical compression spring 80. The rod 79 extends downward from the diaphragm 75 through a tubular support member 81 and passes into the casing 40, having a hooked or offset end 82 engageable with a pin 83 carried by the carriage 64. When the diaphragm 75 is in its lower position as shown, responding to oil pressure in the chamber 76, the offset end 82 of the drive rod 79 permits the carriage 64 to be lowered by its weight and also under the action of a compression spring 64a. This will enable the hooked end 66 of the carriage to intercept and lock the grounding lever 57 during counter-clockwise movement of the latter, said intercepting occurring just short of engagement of the lever with the stationary contact 56.

It will be understood that such counterclockwise movement is possible only upon release of the locking lever 60 and absence of appreciable vacuum in the diaphragm chamber 74. In the absence of oil pressure in the diaphragm chamber 76 the compression spring 80 will force the diaphragm 75 upward, causing the offset end 82 of the drive rod 79 to lift the carriage 64 or swing it clockwise, and this may result in release of the grounding lever 57 by the carriage end 66, enabling the lever to engage the stationary contact 56. Downward movement of the diaphragm 75 and rod 79 in response to oil pressure in the chamber 76 will cause the offset end 82 of the rod to shift downward the locking lever 60, thereby releasing the grounding lever 57 initially for counterclockwise movement.

Thus, whenever the lever 57 is latched in clockwise shifted position by the lever 60 there will be required of the diaphragm 75 and drive rod 79 first a downward movement to release the lever 60 and then an upward movement to lift the carriage 64 and shift the hooked end 66 thereof out of the path of movement of the lever 67. Upon this occurring, the grounding lever may travel under the urging of the spring 53 in a counterclockwise direction, to engage the contact 56. It is supposed that, for such movement, no vacuum exists in the diaphragm chamber 74.

For purposes to be more fully explained hereinafter I provide means by which the contact 56 may be grounded manually and independently of the grounding lever 57. As shown in Figs. 5 and 6, this means comprises a button 85 carried on the front wall or cover plate 86 of the casing 40, said button actuating a pin 87 extending into the casing and having an extension 88 engageable with the side of the contact 56. The pin 87 is also adapted to extend under the carriage 64 for supporting the latter when the button 85 is depressed, the said support of the carriage being such as to enable the grounding lever 57 to be shifted past the hooked end 66. The purpose of this will be more fully described later.

In accordance with the invention I provide a junction switch 90, Figs. 2 and 3, for controlling the circuit of the control device and for enabling the latter to be rendered either operative or inoperative at the will of the operator. The junction switch 90 is a triple pole double throw switch having switch blades 91 of angular configuration, defining a large obtuse angle slightly less than 180°. The switch construction is such that during the switching operation the blades 91 may engage both sets of stationary contacts with which they are cooperable. As shown, the stationary contacts 49 and 56 of the Flovacumatic unit 34 are connected by wires 92 and 93 respectively with one switch blade 91 and a stationary contact terminal 94.

The junction switch 90 controls the energization of the solenoid 55 of the vacuum switch and valve unit 37 and is also connected in the circuit with the vacuum switch portion of said unit.

Referring to Fig. 2, the unit 37 comprises a casing 95 connected by means of a fitting 97 with a vacuum line 98 which is joined to the intake manifold of the truck engine.

The casing 95 has a diaphragm 99 spring urged upward by a helical compression spring 100 and carrying a movable contact plate 101 engageable with stationary contacts 102 and 103. It will be understood that when a vacuum exists below the diaphragm 99 the latter will pull the contact plate 101 away from the contacts 102 and 103, compressing the spring 100. When there is no vacuum in the line 98, the spring 100 will maintain the contact plate 101 in engagement with the contacts 102 and 103.

The neck portion of the casing 95 also has a fitting 104 connected with a line 72, and has a valve seat 105 cooperable with a plunger valve 106 which is actuated by the core 107 of the solenoid 55. The plunger valve 106 is normally held in raised position against the seat 105 by a helical compression spring 108, said spring being compressed and the valve being lowered upon energization of the solenoid 105. Upon this occurring, vacuum existing in the line 98 will be transmitted to the line 72, causing the diaphragm 69 in the casing 70 to be shifted from left to right. It is noted that a passage 110 is provided in the neck portion 96 of the casing 95, by which air can pass between the lines 72 and 98 when the plunger valve 106 is open.

The junction switch 90 has a stationary-contact terminal 111 which is connected by a wire 112 to the manually operable starting switch 113 of the truck, said switch being connected by a wire 114 with the automatic control switch 39 as provided by this invention, whereby starting of the truck engine is positively prevented unless the truck is first placed in proper condition for travel, such condition requiring that the delivery hose be properly placed in the can box of the truck. It is to be here noted that the automatic control of this invention normally causes the truck engine to be halted when the flow of oil ceases by being shut off, either with the nozzle or at the meter, and this will provide the prerequisite, viz., the stopping of the truck engine, by which the operator is prevented through the switch means 39 from driving off without first properly storing away the delivery hose.

Figures 14, 15:
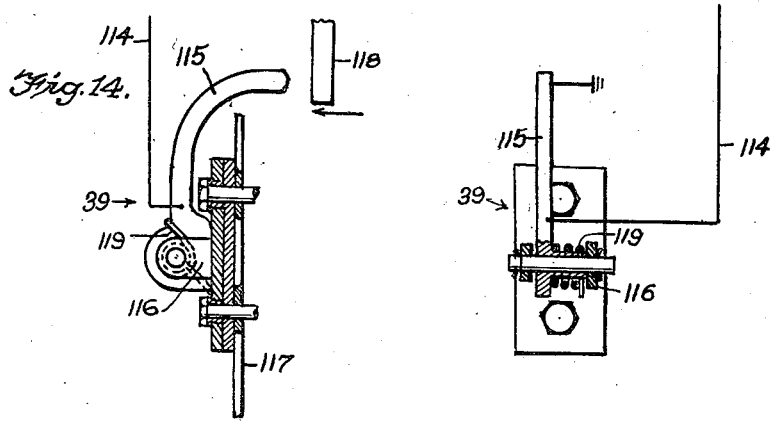
Fig. 14 is a detail of the door-operated switch of the can box.
Fig. 15 is a section on line 15—15 of Fig. 14.

To accomplish this I arrange the grounding switch 39 so that it is closed only when the hose doors are closed. The grounding switch 39 may be of any suitable construction. However, as shown in Figs. 14 and 15, I prefer to construct the switch of a hooked lever 115 pivotally carried by a bracket 116 which is insulatively mounted on inside wall 117 of the can box. The lever 115 is connected with the wire 114 and is arranged to engage the hose door 118 and be grounded thereby when the door is in closed position. As shown, a helical coil spring 119 normally urges the lever 115 in a clockwise direction, as seen in Fig. 14, thereby tending to maintain it in engagement with the door 118. The safety feature as thus provided will be fully explained later.

As already stated, the improved control device of this invention provides for automatic stopping and starting of the truck engine, and to facilitate this operation I provide the solenoid 38 by which automatic actuation of the engine throttle is effeced. As seen in Fig. 13, the solenoid 38 is mounted on a grounded metal bracket 120 which may be clamped by a stud 121 to an engine manifold cleat 122. The solenoid 38 has a plunger 123 connected by means of a link chain 124 with the accelerator rod 125 of the engine. Normally the plunger 123 is maintained in a downwardly extended position by a helical coil spring 126, said spring being compressed and the plunger raised when the solenoid is energized. Such energization will accordingly shift upward the accelerator rod 125, opening the throttle of the engine. Upon de-energization of the solenoid 38, the throttle will again be closed to idling position or to its original preset position by the accelerator rod spring 127.

The remainder of the circuit of the control device of the present invention is as follows:

The solenoid 38 is connected by a wire 38a to the starter motor of the truck to be energized concurrently therewith. The center blade of the junction switch 90 is connected by a wire 130 to the stationary contact 102 of the unit 37. The remaining blade of the switch 90 is connected by a wire 131 to the ignition switch 132 of the engine, said switch being energized by a wire 133 from the car battery. A stationary contact terminal 134 of the switch 90 is connected by a wire 135 with the solenoid 55, the other lead of which is connected by a wire 136 with a stationary contact terminal 137 of the switch 90. The stationary contact terminal 137 is also connected by a wire 138 to a terminal 139 of a relay 140, said relay terminal being also connected by a wire 141 to the distributor and coil of the engine. The relay 140 has terminals 142 and 143 which are connected together by a wire 144 joined to a stationary contact terminal 145 of the switch 90. The relay 140 also has a ground terminal 146 connected by a wire 147 to the stationary contact terminal of the switch 90. The remaining stationary contact 103 of the vacuum 90. The vacuum device 37 is connected by a wire 148 to a power-switch device or solenoid switch 149 for the engine starting motor, said switch being connected by a wire 150 to the car battery and by a wire 151 to the wire 38a and the car starting motor. It will be understood that when the wire 148 is grounded the solenoid switch 149 will be made operative to connect the battery with the starting motor for cranking the engine.

The operation of the improved control device of this invention is as follows:

Assuming that the driver of the fuel truck arrives at destination for making a delivery, he first locates the truck in a desired or necessary position with respect to the customer's tank. The junction switch 90 is assumed to be in the driving position indicated in the drawings. The driver puts the shift lever of the truck in neutral, then engages the power take-off by appropriately moving the lever thereof, with the motor idling. The driver releases the clutch of the truck, whereupon power is transmitted to the pump 23.

Oil will be placed under pressure by the pump, such pressure existing in the line 28, through the back pressure valve 29, line 30, and the valve and air eliminator unit 31. The pressure will exist in the meter 32 and line 33, and in the casing part 41 of the Flovacumatic unit 34. The pressure will also exist in the hose on the reel 36, being transmitted thereto through the line 35. Pressure will further be transmitted through the line 78 of the Flovacumatic unit 34, depressing the diaphragm 75 whereby the locking lever 60 will be depressed and released, this enabling the grounding lever 57 to spring counterclockwise into engagement with the hooked end 66 of the carriage 64, the said carriage having been lowered under the action of the spring 64a by the downward movement of the rod 79. The grounding lever 57 will thus be close to but not in engagement with the stationary contact 56. The above action takes place in a very short time, for example, a small fraction of a second.

The operator now moves the junction switch 90 from the "drive" position to the "automatic" position. The truck engine is now halted by virtue of the relay 140 being de-energized because the wires 147 and 93 are not connected to ground. Oil pressure is maintained in the lines, air eliminator, meter and diaphragm chamber 76 by virute of the back check valve 29. The operator now goes to the rear of the truck, opens the hose door 118, and as he does so the switch 39 is actuated to open the ground circuit, disconnecting the wire 114 from the ground. As will be later pointed out with more particularity, this eliminates the possibility of the driver leaving the hose in the fill pipe of the customer's tank and trying to drive off with the truck after completion of the delivery.

The operator removes the delivery hose from the reel and places the nozzle in the fill pipe of the customer's tank. He then opens the nozzle, whereupon the oil pressure in the delivery hose is reduced, and this triggers the automatic engine starting means as above set forth, by the action of reducing the pressure in the diaphragm chamber 76 and permitting the spring 80 to raise the diaphragm 75. Such action causes the rod 79 to raise the carriage 64, releasing the grounding lever 57 from the hook portion 66 of the carriage. The lever 57 thereupon shifts counterclockwise under the action of the spring 53, engaging the stationary contact 56 and grounding the latter. This will cause the relay 140 to be grounded and energized, thereby energizing the distributor and coil of the engine. Also, through the center switch blade 91 of the switch 90 of the wire 130 will be grounded through the contacts 102 and 103 of the unit 37, grounding the solenoid starting switch 149. This will result in the engine being cranked, and at the same time the solenoid 38 connected by the wire 38a to the cranking motor of the engine becomes energized and advances the throttle. This prevents any appreciable vacuum being created in the vacuum line 98 which might tend to break the circuit between the contacts 102 and 103 and make the cranking of the engine erratic. Upon the engine starting, the vacuum in the line 98 will be sufficient to open the circuit between the contacts 102 and 103 in the unit 37, thereby de-energizing the solenoid 149 and halting the cranking of the engine. At the same time the solenoid 38 is de-energized, enabling the throttle to be again retarded by the spring 127. During the pumping of oil, the contacts 102 and 103 of the unit 37 cannot be connected because of the vacuum maintained in the line 98.

The ignition circuit, it will be understood, includes the wire 133, the ignition switch 132, the wires 131 and 144, the relay 140, and the wire 141 which latter goes to the distributor and coil of the engine (not shown in the drawing). From the relay 140 energization of the vacuum valve solenoid 55 is effected through the wires 138, 136 and 135, the latter being connected to ground through the switch 90, wire 92 and grounding switch 48 in the Flovacumatic unit 34. At the time the grounding lever 57 had engaged the contact 56 the vacuum valve solenoid 55 was energized through the circuit just traced. This permits a small vacuum to exist in the line 72 and diaphragm chamber 74, pulling the diaphragm 69 very slightly to the right, and shifting the grounding lever 57 slightly clockwise. The extent of movement, however, of the lever 57 is not sufficient to separate it from the contact 56, since the latter is spring charged and also able to travel a slight extent. The flow of oil which now occurs through the portion 41 of the casing of the Flovacumatic unit 34 will spring open the gate 43, thereupon separating the contact 51 from the contact 49 whereupon the solenoid 55 is de-energized, closing the vacuum valve 106 and shutting off vacuum from the line 72 and chamber 74. Thus the oil will continue to flow through the delivery hose, as supplied by the pump 23 and the truck engine.

Upon completion of the required amount of oil the operator may close the nozzle of the delivery hose, or the meter may automatically close the meter valve, thereby halting the flow of oil. The gate 43 now moves rapidly clockwise as viewed in Fig. 2 under the urging of the spring 53, and in so doing it causes the contact 51 to engage the contact 49. This causes energization of the solenoid 55, thereby to open the vacuum valve 106, whereupon the vacuum will be created in the line 72 and diaphragm chamber 74, pulling the diaphragm 69 from left to right. This will swing the grounding lever 57 clockwise, separating it from the contact 56 whereupon the ground circuit through the wires 93 and 147 is broken.

The relay 140 is de-energized, thereby cutting the ignition to the coil and stopping the engine of the truck. The vacuum in the line 72 is sufficient to swing the grounding lever 57 clockwise far enough so that it is locked by the hooked portion 66 of the carriage 64. Pressure is also maintained in the various oil lines, whereupon the diaphragm 75 of the unit 34 is held depressed, permitting the carriage 64 to lock the grounding lever 57.

However, if it is desired to again start the flow of oil, this may be accomplished merely by opening the hose nozzle or the meter valve, whereupon the starting of the truck engine will take place in the manner already described above.

If the oil flow has been halted by the predetermined shut-off valve of the meter, the operator removes the hose nozzle from the filler pipe of the customer's tank, proceeds to the truck and reels in the hose. He may remove the meter slip if the meter is of the printer type and replace it with a new slip, resetting the meter in the usual way. For such operation no pressure exists in the hose but oil pressure remains in the lines back of the meter valve, and remains in the diaphragm chamber 76. The operator may now depress the lever 59 by which the grounding lever 57 is manually shifted clockwise as viewed in Fig. 2. However, the grounding lever 57 will not be locked by the locking lever 60 since pressure remains in the diaphragm chamber 76, maintaining the drive rod 79 in a lowered position. While the operator holds the manually operable lever 59 depressed, he opens the meter valve, allowing the oil pressure to be absorbed by the flexure in the delivery hose. This will release the pressure in the diaphragm chamber 76, enabling the spring 80 to raise the rod 79 whereupon the locking lever 60 is free to spring upward and lock the grounding lever 57 in reset position (swung clockwise or to the right as viewed in Fig. 2).

If upon occasion a customer may decide belatedly that he desires a few more gallons, the procedure is as follows: The operator takes the hose and nozzle back to the customer's tank inserts the nozzle in the fill pipe and opens it. He then goes back to the rear of the oil truck and depresses the button 85. This holds the carriage 64 in raised position and also grounds the contact 56 by engagement thereof with the extension 88 on the pin 87. Grounding of the contacts 56 will start the truck engine and pump, creating pressure in the diaphragm chamber 76, which will result in the diaphragm 75 and rod 79 shifting downward, thereupon swinging clockwise and releasing the locking lever 60. The grounding lever 57 will now spring counterclockwise under the action of the spring 53 and move into engagement with the stationary contact 56. By virtue of the pin 87 holding the carriage 64 raised when the button 85 is depressed, the grounding lever 57 will not be obstructed by the hooked end 66 of the carriage 64.

Upon the delivery of oil being finally completed, the operator returns the delivery hose to the truck, closes the doors 118 of the can box, thereby automatically closing the grounding switch 39. He then goes to the cab of the truck, and shifts the junction switch 90 to its "drive" position. He may then start the truck engine in the usual manner and drive off. If, however, he has neglected to replace the hose in the can box and close the doors thereof, the grounding switch 39 will remain open, preventing him from starting the truck engine by virtue of the starting switch circuit including the wires 112 and 114 and the switch 113 remaining inoperative, and this is an important feature of the invention.

It will be noted that the grounding switch 39 functions in conjunction with the automatic engine control which is responsive to opening and closing of the hose nozzle or meter valves. Involved in the starting of the truck engine after the equipment of the truck has been placed in proper order are the switch 90 shifted to drive position, the vacuum switch unit 37 and the solenoid switch 149. It will be noted that if a system is not employed by which the truck engine is automatically shut off upon halting of the flow of oil through the delivery hose, there would be no point to having the automatic grounding switch 39 incorporated as a safety measure, since with the truck engine running all of the time the operator could drive off even though he had forgotten to reel in the delivery hose. The provision of the control system of this invention by which the truck engine is automatically stopped when the delivery is completed is therefore a prerequisite to the feature by which the operator is prevented from starting the engine and driving off until all of the oil delivery equipment is properly stored away.

Where a truck is not provided with a can box having hose doors, I provide an alternative arrangement to replace the grounding switch 39. As shown in Figs. 11 and 12, I provide a pair of electrically-insulated spring clips 154 and 155 arranged to releasably hold the nozzle 156 of the delivery hose. The clip 154 is connected to ground circuit and the insulated clip 155 to the wire 114. Thus whenever the nozzle is removed from the clips, the ground circuit will be opened, and when the nozzle is replaced in the clips, the ground circuit will be closed through the wire 114.

Tension of the spring 80 controlling the diaphragm 75 may be regulated by the initial setting of the nut 80a, Fig. 2, thereby to set the unit for second and third floor deliveries. The starting line pressure may be figured as ½ lb. per foot of elevation plus 3 lbs. as a safety factor. Thus a 20-foot elevation would require 10 lbs. plus 3 lbs. or 13 lbs. starting line pressure.

It will be noted that the throttle advancing solenoid 38 functions each time that the engine is cranked, thereby facilitating the starting of the engine even though no oil delivery operation is being carried out.

The control device of this invention is relatively simple and has no delicate critically adjusted parts which might become broken or get out of order easily. Thus the system is reliable at all times. Considerable saving in gasoline and effort on the part of the operator is effected by the fully automatic operation of the apparatus, and the latter is relatively simple and economical to fabricate and install. The saving in time and gasoline will result in a return on the investment required in a relatively short period.

Variations and modifications may be made in this invention without departing from the spirit thereof or the scope of the appended claims.

I claim:

1. In combination, a delivery vehicle having a propelling engine controlled by electrical circuits, and having a container for liquid which is to be delivered; a delivery line including a hose connected to said container; means for storing said hose on the vehicle; a member movable with respect to the vehicle and having a normal position thereon, said member requiring actuation from said position as an incident to removing the hose from storage position; and safety means connected to the electrical circuits of the engine and controlled by said movable member for rendering inoperative said circuits when the member is out of said normal position, thereby to reduce the likelihood of inadvertent operation of the engine; and a holder for the nozzle of the hose, the said movable member comprising the said nozzle.

2. The invention as defined in claim 1 in which the holder comprises insulated metal clips constituting part of the safety means, said nozzle electrically bridging the clips.

3. The invention as defined in claim 2 in which one of said metal clips is grounded to the frame of the vehicle.

4. In combination, a delivery vehicle having a propelling engine controlled by electrical circuits, and having a container for liquid which is to be delivered; a delivery line including a hose connected to said container; means for storing said hose on the vehicle; a member movable with respect to the vehicle and having a normal position thereon, said member requiring actuation from said position as an incident to removing the hose from storage position; and safety means connected to the electrical circuits of the engine and controlled by said movable member for rendering inoperative said circuits when the member is out of said normal position, thereby to reduce the likelihood of inadvertent operation of the engine; automatic means controlling said engine, for pumping said liquid through the hose with power supplied by the engine; and selector means for rendering operative either said safety means or said automatically operative means.

5. In combination, a delivery vehicle having a propelling engine controlled by electrical circuits, and having a container for liquid which is to be delivered; a delivery line including a hose connected to said container; means for storing said hose on the vehicle; a member movable with respect to the vehicle and having a normal position thereon, said member requiring actuation from said position as an incident to removing the hose from storage position; safety means connected to the electrical circuits of the engine and controlled by said movable member for rendering inoperative said circuits when the member is out of said normal position, thereby to reduce the likelihood of inadvertent operation of the engine; automatic means controlling said engine, for pumping said liquid through the hose with power supplied by the engine; selector means for rendering operative either said safety means or said automatically operative means; a power-operated starting-switch for the engine; and a manually-operated starting-switch for controlling the power-operated switch, said selector means being operable to connect and disconnect the said switches to and from each other.

6. The invention as defined in claim 5 in which the selector means includes a double-throw switch, and in which the said automatic means includes switches responsive to liquid pressure and vacuum, connected to said power-operated starting-switch when the double-throw switch is in one of its positions.

7. In combination, a delivery vehicle having a propelling engine controlled by electrical circuits, and having a container for liquid which is to be delivered; a delivery line including a hose connected to said container; means for storing said hose on the vehicle; a member movable with respect to the vehicle and having a normal position thereon, said member requiring actuation from said position as an incident to removing the hose from storage position; safety means connected to the electrical circuits of the engine and controlled by said movable member for rendering inoperative said circuits when the member is out of said normal position, thereby to reduce the likelihood of inadvertent operation of the engine; automatic means controlling said engine, for pumping said liquid through the hose with power supplied by the engine; selector means for rendering operative either said safety means or said automatically operative means; and a housing for the hose, said safety means including an electric switch, and said movable member comprising a door of said housing, arranged to actuate said switch.

8. The invention as defined in claim 7 in which the safety means includes a grounding circuit, and in which said electric switch is included in said grounding circuit.

9. In combination, a delivery vehicle having a propelling engine controlled by electrical circuit, and having a container for liquid which is to be delivered; a delivery line including a hose connected to said container; means for storing said hose on the vehicle; a member movable with respect to the vehicle and having a normal position thereon, said member requiring actuation from said position as an incident to removing the hose from storage position; safety means connected to the electrical circuits of the engine and controlled by said movable member for rendering inoperative said circuits when the member is out of said normal position, thereby to reduce the likelihood of inadvertent operation of the engine; automatic means controlling said engine, for pumping said liquid through the hose with power supplied by the engine; selector means for rendering operative either said safety means or said automatically operative means; and a holder for the hose nozzle, said safety means including an electric switch device, and said nozzle cooperating with said switch device and comprising the said movable member.

10. In combination, a delivery vehicle having a propelling engine controlled by electrical circuits, and having a container for liquid which is to be delivered; a delivery line including a hose connected to said container; means for storing said hose on the vehicle; a member movable with respect to the vehicle and having a normal position thereon, said member requiring actuation from said position as an incident to removing the hose from storage position; safety means connected to the electrical circuits of the engine and controlled by said movable member for rendering inoperative said circuits when the member is out of said normal position, thereby to reduce the likelihood of inadvertent operation of the engine; automatic means controlling said engine, for pumping said liquid through the hose with power supplied by the engine; and selector means for rendering operative either said safety means or said automatically operative means, said automatic means being triggered by release of liquid pressure in the delivery line.

References Cited in the file of this patent
UNITED STATES PATENTS

| | | |
|---|---|---|
| 1,705,649 | Scott | Mar. 19, 1929 |
| 1,801,501 | Griffin | Apr. 21, 1931 |
| 1,825,775 | Brubaker | Oct. 6, 1931 |
| 2,315,085 | Churchward | Mar. 30, 1943 |
| 2,366,925 | May | Jan. 9, 1945 |